(12) United States Patent
Sitaraman et al.

(10) Patent No.: US 8,073,924 B2
(45) Date of Patent: Dec. 6, 2011

(54) ROUTING AND DELIVERY OF DATA FOR ELECTRONIC DESIGN AUTOMATION WORKLOADS IN GEOGRAPHICALLY DISTRIBUTED CLOUDS

(75) Inventors: Sriram Sitaraman, Sunnyvale, CA (US); Bradley David Francis Jones, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/019,890

(22) Filed: Feb. 2, 2011

(65) Prior Publication Data
US 2011/0246997 A1 Oct. 6, 2011

Related U.S. Application Data

(60) Provisional application No. 61/387,625, filed on Sep. 29, 2010, provisional application No. 61/319,189, filed on Mar. 30, 2010, provisional application No. 61/319,191, filed on Mar. 30, 2010.

(51) Int. Cl.
G06F 15/167 (2006.01)
G06F 17/50 (2006.01)
(52) U.S. Cl. ......... 709/213; 716/100; 716/101; 716/102
(58) Field of Classification Search .......... 709/213–216; 716/100–139; 717/162–167
See application file for complete search history.

(56) References Cited

U.S. PATENT DOCUMENTS

| | | | |
|---|---|---|---|
| 5,812,130 A | 9/1998 | Van Huben et al. | |
| 5,826,265 A | 10/1998 | Van Huben et al. | |
| 5,907,494 A | 5/1999 | Dangelo et al. | |
| 5,950,201 A | 9/1999 | Van Huben et al. | |
| 6,327,594 B1 | 12/2001 | Van Huben et al. | |
| 6,519,756 B1 * | 2/2003 | Kao et al. | 716/103 |
| 6,721,614 B2 | 4/2004 | Duncan et al. | |
| 7,546,571 B2 | 6/2009 | Mankin et al. | |
| 7,975,247 B2 | 7/2011 | Anantharaman et al. | |

FOREIGN PATENT DOCUMENTS

JP 2002215729 A * 8/2002

OTHER PUBLICATIONS

Wadhwani, R., "Panel: The Key to EDA Results: Component & Library Management," 30th Conference on Design Automation, Jun. 14-18, 1993, pp. 766-766.
Pathan, A.K. et al., "A Taxonomy and Survey of Content Delivery Networks," Technical Report, Feb. 12, 2007, pp. 1-44.

* cited by examiner

*Primary Examiner* — Brendan Higa
(74) *Attorney, Agent, or Firm* — Fenwick & West LLP

(57) ABSTRACT

Electronic design automation (EDA) libraries are delivered using a geographically distributed private cloud including EDA design centers and EDA library stores. EDA projects associated with an EDA library are determined by matching information describing the EDA library with information describing the projects. A set of design centers hosting the projects is determined. A data delivery model is determined for transmitting the EDA library to the design centers. The EDA library is scheduled for delivery to the design centers based on a deadline associated with a project stage that requires the EDA library. Network links with specialized hardware for transmitting data are determined in the private cloud by measuring their deterioration in performance on increase of data transmission load. These links are used for delivering EDA libraries expected to be used urgently for a stage of an EDA project.

20 Claims, 5 Drawing Sheets

ROUTING AND DELIVERY OF DATA FOR ELECTRONIC DESIGN AUTOMATION WORKLOADS IN GEOGRAPHICALLY DISTRIBUTED CLOUDS

CROSS-REFERENCE TO RELATED APPLICATIONS

This application claims priority under 35 U.S.C. §119(0 to U.S. Provisional Patent Application No. 61/387,625 entitled "Routing and Delivery of Data for Electronic Design Automation Workloads in Geographically Distributed Clouds," filed on Sep. 29, 2010; U.S. Provisional Patent Application No. 61/319,189 entitled "Intelligent Delivery of Data for Electronic Design Automation Workloads in Geographically Distributed Clouds," filed on Mar. 30, 2010; U.S. Provisional Patent Application No. 61/319,191 entitled "Routing Data for Electronic Design Automation Workloads in Geographically Distributed Private Clouds," filed on Mar. 30, 2010, which are incorporated by reference herein in their entirety.

FIELD

This disclosure relates to routing, delivery, and replication of data used by Electronic Design Automation (EDA) workloads in geographically distributed cloud computing systems.

DESCRIPTION OF THE RELATED ART

EDA workload runs involve the use of libraries. IP cores, regressions and other types of data. Enterprises running EDA workloads can have geographically distributed computation farms. These companies attempt to make necessary data available at as many geographically distributed locations as possible. The size of the data needed for running EDA workloads can be significant.

Several companies utilize cloud computing model for distribution of computing resources. Companies running EDA workloads can utilize a private cloud, a public cloud, or a hybrid combination of the two. A private cloud is a cloud computing system on a private network. An enterprise with a private cloud has control on the data transferred via the private network hosting the private cloud. For example, the enterprise has information describing the characteristics of data being transferred as well as timing of the data transfer including data transfers scheduled for a future time. In contrast, an enterprise using a public cloud may not have a tight control on the load and the data being transferred via the public cloud at a given time.

In conventional EDA environment, data delivery model for large volume data have been very static and dependent on the source site and destination site. In private clouds, static models of data delivery break down due to the dynamic nature of environment provisioning for EDA workloads. Therefore, conventional systems that model private clouds after static paths do not perform optimally and fail to utilize the available resources appropriately.

SUMMARY

Embodiments allow efficient delivery of electronic design automation (EDA) libraries using a geographically distributed private cloud including EDA design centers and EDA library stores. EDA projects are associated with one or more design centers that execute the project and EDA libraries are associated with EDA library stores. Information describing EDA projects and EDA libraries is received. An EDA library is associated with a set of EDA projects that are expected to use the EDA library. The EDA projects associated with the EDA library are determined by matching information describing the EDA library with information describing the projects. For each project associated with the EDA library, a project stage is determined that uses the library. A set of design centers hosting the projects is identified. A data delivery model is determined for transmitting the EDA library to the design centers. The EDA library is scheduled for delivery to the design centers based on a deadline associated with the project stage that uses the EDA library.

In some embodiments, the EDA library is matched with EDA projects by identifying attributes of previous projects that used the EDA library. The identified attributes are matched against newer projects to identify projects likely to use the EDA library in future.

In some embodiments, a newer version of an EDA library is received by the library store. EDA projects that used a previous version of the EDA library are identified. A testing stage of the EDA projects is anticipated for testing the newer version of the EDA library. Accordingly, the EDA library is delivered to data centers hosting these projects.

In some embodiments, a network link used for transmitting data is determined to have specialized hardware for fast transmission of data. This determination is made by increasing the data delivery load of the link and measuring the deterioration in performance of the link. If the deterioration in performance is determined to be below a threshold value, the link is determined to have specialized hardware for fast transmission of data. EDA libraries are sent via such links if the transmission of the library is expected to be used for a project stage in advance of a short deadline.

The features and advantages described in this summary and the following detailed description are not all-inclusive. Many additional features and advantages will be apparent to one of ordinary skill in the art in view of the drawings, specification, and claims hereof.

Figure 1:
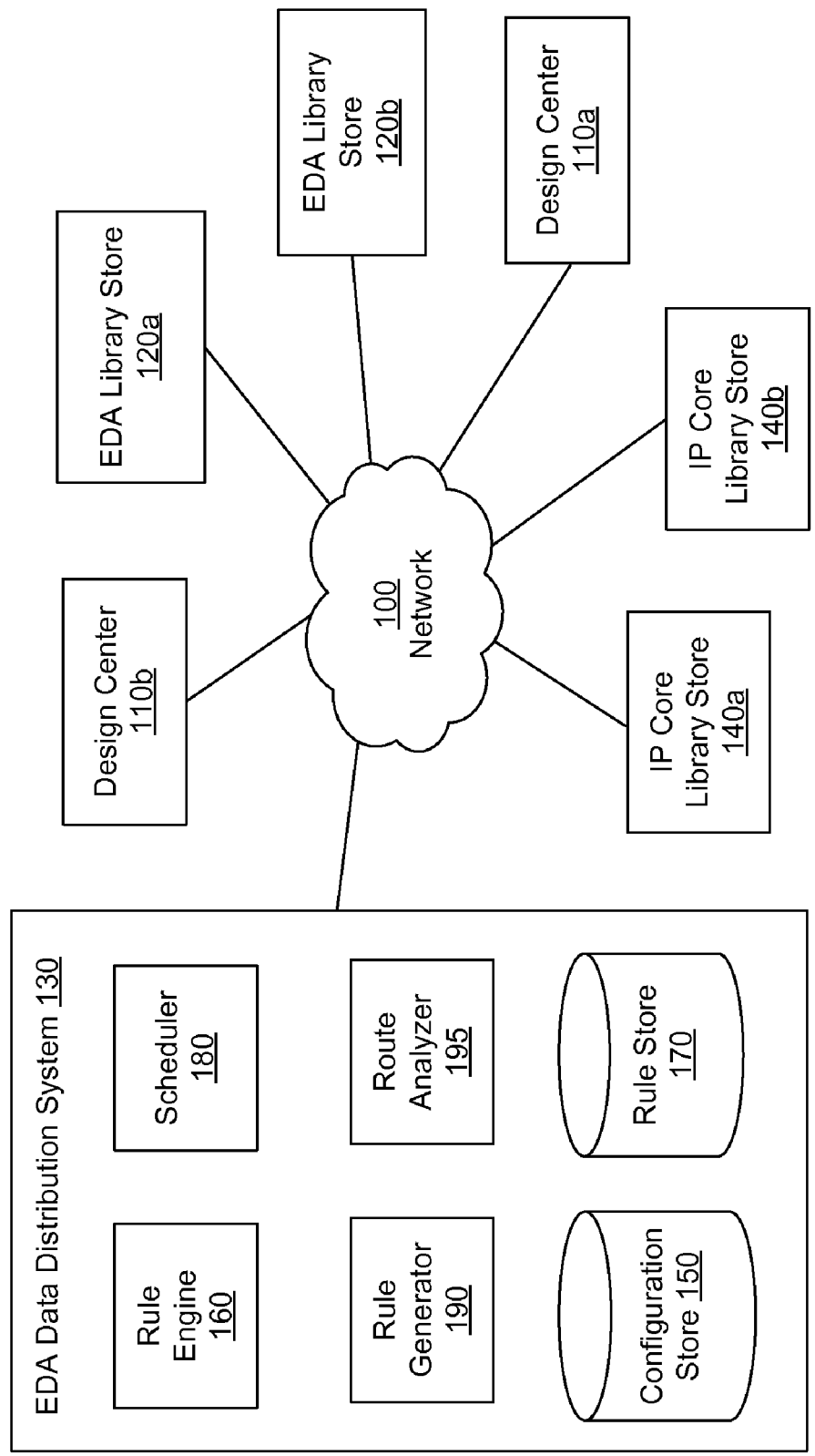
FIG. 1 is a diagram illustrating a system environment for delivering data used by EDA workloads in geographically distributed clouds, according to one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Large organizations designing EDA circuits may be geographically distributed. These organizations may include multiple design centers, sources of EDA libraries, and IP core libraries. The network of distributed computing resources of such an organization can be considered a private cloud. The organization may also leverage the computational resources of a public cloud, thereby creating a hybrid cloud that includes private computing resources as well as resources from a public cloud.

An example organization developing EDA products may have a research and development laboratory in Sunnyvale, Calif., and design centers in India or China. A design center may work on an EDA project for designing a particular circuit providing a specific functionality. An EDA project comprises various stages that perform design, development, and testing of EDA products. The project may be executed in one or more design centers. A project stage comprises a set of tasks related to the development of the product that are typically executed together. There may be dependencies between projects, for example, a particular stage may have to be completed before a dependent stage can be executed. EDA projects may have attributes describing the project, for example, attributes describing the type of product being developed. The attributes of the project provide information useful to determine the requirements of the project. EDA projects also typically have an associated time line describing the expected dates of execution or completion of various tasks.

To execute particular stages of a project, the design center needs various EDA libraries or IP core libraries (henceforth, EDA libraries and IP core libraries are collectively referred to as "the EDA library"). For example, a design center working on a new functionality for a calculator may need an IP core library for liquid crystal display (LCD) or other relevant functionality of the calculator for testing the new functionality. The libraries used by different design centers are identified and transmitted to the appropriate design centers.

An EDA data distribution system determines the data needed by the design centers in advance of the actual time the data is used and pre-fetches the data to the appropriate design centers. In an embodiment, the requirements of the various design centers are inferred from high-level specifications of the projects planned or being executed at the design centers. Alternatively, the requirements of the different design centers may be specified by the users of the design centers. In an embodiment, an availability of a new release or version of a library triggers a transfer of the library to appropriate design centers executing projects that expect to use the library. The EDA data distribution system pushes new releases of the library to the design centers in anticipation of a need to test the EDA software against the new release of the library.

In one embodiment, the EDA data distribution system tracks key performance indicators (KPIs) of the network. The KPIs include, but are not limited to, bandwidth utilization, latency, packet loss and path characteristics for geographically distributed sites/datacenters to determine the optimum path for the data transfer. The optimum path may comprise multiple intermediate hops rather than a direct path based on the analysis. If the data is replicated to multiple sites, the EDA data distribution system analyzes the age of the data at each site to identify the best site to replicate from. For example, if there are frequent point releases of a software library, the EDA data distribution system may prefer the site with a more recent point release over a site with an older point release.

Intelligent routing of data transfers of EDA libraries to design centers is performed based on real time and cumulative data to ensure that the optimum path is selected. Conventional data transfers are done from point A to point B without any specific path optimization based on the specific data being transferred. As a result, there is the potential that better paths for specific data transfer are missed or that there are additionally sources of the same data available locations from where data transfer is more efficient. The proposed model maintains a detailed database of KPIs as well as file data to determine the best path as well as the most appropriate source for the data transfer.

System Architecture

FIG. 1 shows a system environment for delivering data used by EDA workloads in geographically distributed clouds. The system environment comprises one or more EDA library stores 120, a network 100, one or more IP core library stores 140, one or more design centers 110, and an EDA data distribution system 130. The EDA data distribution system 130 comprises a rule engine 160, a rule store 170, a rule generator 190, a route analyzer 195, a scheduler 180, and a configuration store 150.

FIG. 1 and the other figures use like reference numerals to identify like elements. A letter after a reference numeral, such as "110*a*," indicates that the text refers specifically to the element having that particular reference numeral. A reference numeral in the text without a following letter, such as "110," refers to any or all of the elements in the figures bearing that reference numeral (e.g. "110" in the text refers to reference numerals "110*a*" and/or "110*b*" in the figures).

The design centers 110 comprise one or more computers used for design of circuits using EDA tools. The EDA library store 120 comprises computer systems that store various EDA libraries that include, for example, libraries for design rule check, timing verification, placement, routing and the like. Certain EDA library stores that specifically store IP Cores are called the IP core library stores. An core library store 140 comprises computer systems storing various IP core libraries, for example, libraries for circuit components related to USB (Universal Serial Bus) 2.0 controllers, USB 3.0 controllers, LCD (Liquid Crystal Display) driver circuitry and the like. The various libraries can also be referred to as data sets.

The network 100 enables communications between the various systems including, the design centers 110, the EDA library stores 120, the IP core library stores 140, and the EDA data distribution system. In one embodiment, the network 100 uses standard communications technologies and/or protocols. Depending upon the embodiment, the network 100 can also include links to other networks such as the Internet.

The EDA data distribution system 130 comprises one or more computer systems that determine the various sources and destinations of data including various libraries and identify a more efficient way to transfer the data sets/libraries from the sources to the destinations. In an embodiment, the EDA data distribution system 130 can be executed at a design center, at a computer system comprising an EDA library store or a computer system comprising an IP core library store.

The configuration store 150 stores the information regarding the various design centers 110, EDA library stores 120, and the IP core library stores 140. The configuration store 150 stores the locations of the various libraries, the versions of the libraries available at the various locations, the size of the library, the projects being worked on or planned in various design centers 110.

The rule store 170 stores various rules for determining policies related to data sets/library transfer from various sources to destinations. For example, a rule may specify that a particular EDA library is used for design stages of EDA projects with certain attributes. Another rule may specify whether certain versions of two different EDA libraries are compatible or not. The rules stored in the rule store 170 are executed in conjunction with the information stored in the configuration store 150 to determine the actual data sets/ library transfers that need to be executed in order to transfer the data efficiently.

The rule engine 160 applies rules stored in the rule store 170 to the information describing the EDA projects and EDA libraries stored in the configuration store 150 to infer information used by the scheduler 180 for scheduling the various data transfer operations. The rule engine 160 resolves conflicts between inferred information that contradicts with each other. For example, if two different sets of rules infer the use of two different versions of an EDA library for a stage of an EDA project, the rule engine 160 may resolve the conflict by using the latest version.

The route analyzer 195 allows the EDA data distribution system 130 to make intelligent routing decisions. For example, the route analyzer 195 determines whether certain network links have hardware to expedite the delivery of libraries via the link. Based on the network information provided by the route analyze 195, the scheduler makes specific scheduling decisions of data transfer via certain network routes.

The scheduler 180 schedules the actual data transfer operations from sources to the destinations at appropriate times based on the priority of the tasks and network availability. For example, data that is needed for a project that is currently in progress is given higher priority compared to data transferred in advance of a need at a design center. The scheduler 180 invokes the rule engine 160 to infer information necessary for scheduling various data transfer operations by applying the rules stored in the rule store 170 to the facts stored in the configuration store 150. For example, the scheduler may invoke the rule engine 160 and determine that a particular EDA library is expected to be used for a particular EDA project in a specific time window. The scheduler 180 subsequently schedules the delivery of the EDA library to the data center hosting the EDA project ahead of the time window.

The scheduler 180 determines sources and destinations for various libraries based on information provided by the various design centers. In an embodiment, a design center that determines need for particular libraries explicitly requests the libraries. In other embodiments, the requirements of the design centers are inferred from the information describing the EDA projects. The scheduler may give higher priority to EDA libraries used for earlier stages of a project over EDA libraries used for later stages of the same project. For example, the scheduler 180 may schedule EDA libraries used for logic design, circuit simulation, placement, and routing to the design center for an earlier delivery date compared to IP core libraries used for regression testing. In an embodiment, the scheduler 180 schedules transfer of the EDA libraries expected to be used for different stages of design process for delivery in the same order as the sequence in which the stages are typically performed in the design process. For example, libraries used for high level design are scheduled to be delivered ahead of libraries used for placement and routing. In an embodiment, the scheduler 180 schedules transfers of EDA libraries based on a project schedule provided by the design center comprising the timelines or sequences of the various stages of the project including, design, functional verification and testing, system verification and testing, etc.

The rules stored in the rule store 170 may be provided by a system administrator or automatically derived by the rule generator 190. The rule generator 190 may derive rules and present them to a system administrator for approval. The rule generator 190 adds the rules to the rule store 170 subsequent to their approval by a system administrator. The rule generator 190 can derive rules based on usage of EDA libraries in previously executed projects. For example, if an LCD IP core library was used in previous projects related to calculators, a subsequent project implementing functionality for a calculator can be assumed to use the LCD core library. Accordingly, the rule generator 190 derives a rule for transferring the LCD core library to design centers involved in designing of a calculator in advance of receiving an explicit request for such library.

The rule generator 190 can derive rules that transfer IP core libraries or EDA libraries to design centers when a new version of the library is available. For example, a new version (say version 3.0) of an IP core library may be available. The configuration store 150 keeps track of the various design centers that store older versions of the IP core libraries. The rule generator 190 derives a rule to transfer newer versions of the IP core library to the design centers with older versions of the library in anticipation of the need for testing the newer version. In an embodiment, the rule generator 190 derives rules based on high-level policy decisions provided by an organization. For example, certain design centers perform testing of beta versions of newer libraries whereas other design centers do not perform testing of beta versions of the libraries. Alternatively, certain design centers perform testing of point releases of the libraries whereas other design centers perform testing of only major releases. The rule generator 190 derives appropriate rules that incorporate the policy requirements of the organization or the individual design centers.

In some embodiments, providers/developers of libraries annotate the libraries with information useful to determine their use. A developer may add metadata to a library describing the types of projects and the stages of the project that the library is useful for. For example, an LCD library can be annotated with information indicating that the library is useful for designing laptops with LCD displays, calculators, and LCD televisions. The annotated information associated with the libraries is used to determine the potential destinations for the libraries.

In some embodiments, the scheduler 180 presents a list of libraries to be shipped to a design center to a system administrator for approval. The system administrator ensures that libraries are not transferred to a data center unnecessarily. The system administrator may also add, delete or modify the rules of the rule store 170 to avoid unnecessary transfer of data.

In an embodiment, the rule generator 190 analyzes characteristics associated with the previous transfers of libraries in view of the actual usage of the libraries. For example, the rule generator 190 can analyze the time difference between the transfer of the library and the actual usage of the library, or whether there was any usage at all. The rule generator 190 can use this information to determine the effectiveness of the rules. For example, a rule that transfers a library to a data center that is never used can be presented to a system administrator to determine whether the rule should be removed from the rule store 170. Accordingly, the usage information is used to fine tune the rules of the rule store 170.

Intelligent Delivery of Data for EDA Workloads

Figure 2:
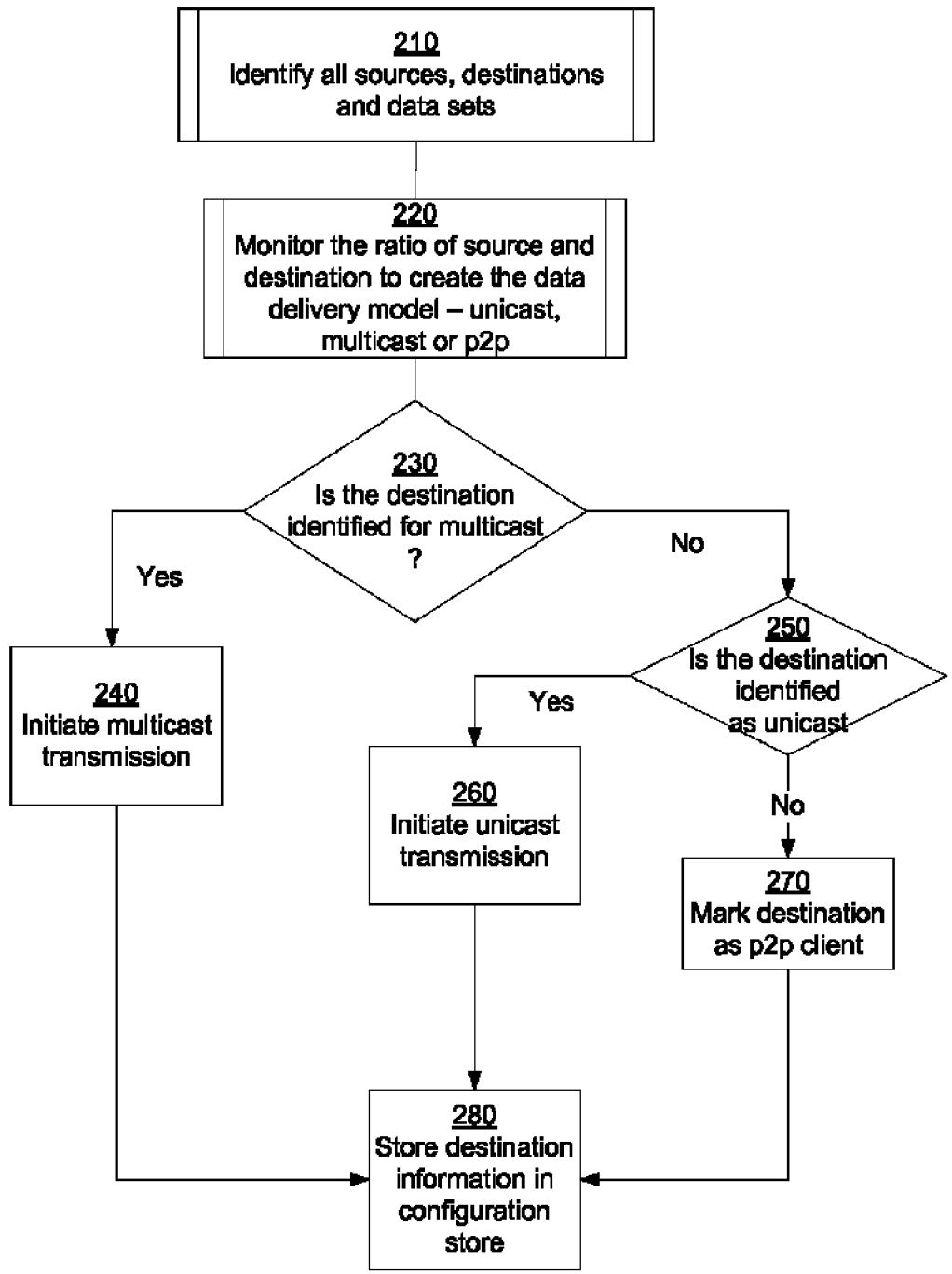
FIG. 2 is a flowchart illustrating a method of determining the delivery model between sources and destinations of various data sets, according to one embodiment.

FIG. 2 is a flowchart illustrating a method of determining the sources and destinations of various data sets, executed by an EDA data distribution system 130. The scheduler 180 identifies 210 all sources and destinations of the data sets, for example, using the rule engine 160. The scheduler 180 monitors 220 the ratio of numbers of sources and destinations for a particular library/data set to determine the data delivery model. The scheduler 180 further checks 230, 250 if a particular destination is suitable for a multicast or if the destination suitable for a unicast.

If a data set is to be replicated from one to many sites, the scheduler 180 determines a multicast model as a suitable delivery model. In case of a multipoint site to site data replication, the scheduler 180 can employ any one of unicast, multicast or peer-to-peer model as the fastest data delivery model. If the data is replicated from one site to a single site, the scheduler 180 determines that the destination is suitable for a unicast model for data delivery, taking into account more efficient path for transfer. If the scheduler 180 determines that the destination is suitable for multicast, the scheduler 180 schedules 240 a multicast session. If the destination is identified 250 as suitable for unicast, the scheduler 180 schedules 260 a unicast transmission. If the destination is not identified as suitable for unicast or multicast, the scheduler 180 schedules 270 a P2P (peer-to-peer) transfer a and marks the destination as a P2P client. The destination information derived is stored 280 in the configuration store.

Figure 3:
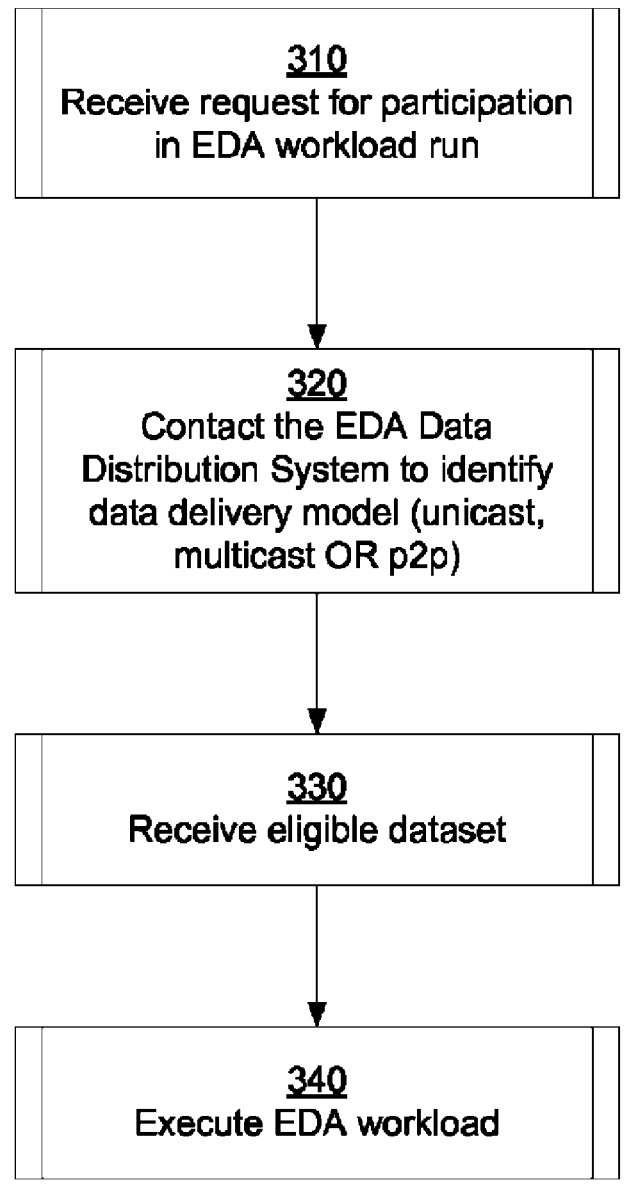
FIG. 3 is a flowchart illustrating the method for receiving eligible data sets executed by a destination of data sets, according to one embodiment.

FIG. 3 is a flowchart illustrating the method for receiving eligible data sets executed by a destination, according to one embodiment. The destination system receives 310 a request for participation in an EDA workload run. The destination system contacts 320 the EDA distribution system 130 to provide the necessary information used to derive the data delivery model associated with the destination. Based on the data delivery model, the destination receives 330 eligible data set and executes 340 the EDA workload.

Routing Data for EDA Workloads

The EDA data distribution system 130 utilizes the information describing the amount of data to be transferred from various sources to various destinations to determine the network paths to be followed from a particular source to a destination. The use of private clouds provides control over the network traffic between various nodes of the private cloud. For example, the scheduling system of the private network can ensure that a large data set being transferred from a source to the destination during a time period is the predominant load on the network links used for the transfer (and no other large data transfer is performed on those links). In a public cloud, the scheduling system cannot ensure or predict the network load on various links since the users and their usage of the links is not predictable.

The ability to schedule the delivery of data sets using the scheduler 180 provides the EDA data distribution system 130 with the ability to predict network loads for various paths. In an embodiment, scheduler 180 makes decisions to transfer data via a particular route based a the predicted load via the links in that route. For example, based on requirement of libraries at one or more design centers, the EDA data distribution center 130 may have information indicating high load on a path during a given time interval, for example, between time T1 and T2. The scheduler 180 schedules a new task related to transfer of libraries on the above path for another project outside the time interval between T1 and T2 if possible. If the new task related to transfer of library is identified as more urgent compared to the tasks already scheduled in the time interval T1 and T2, the scheduler may move the tasks already scheduled in the time interval T1 and T2 to make resources available for the new task.

Figure 4:
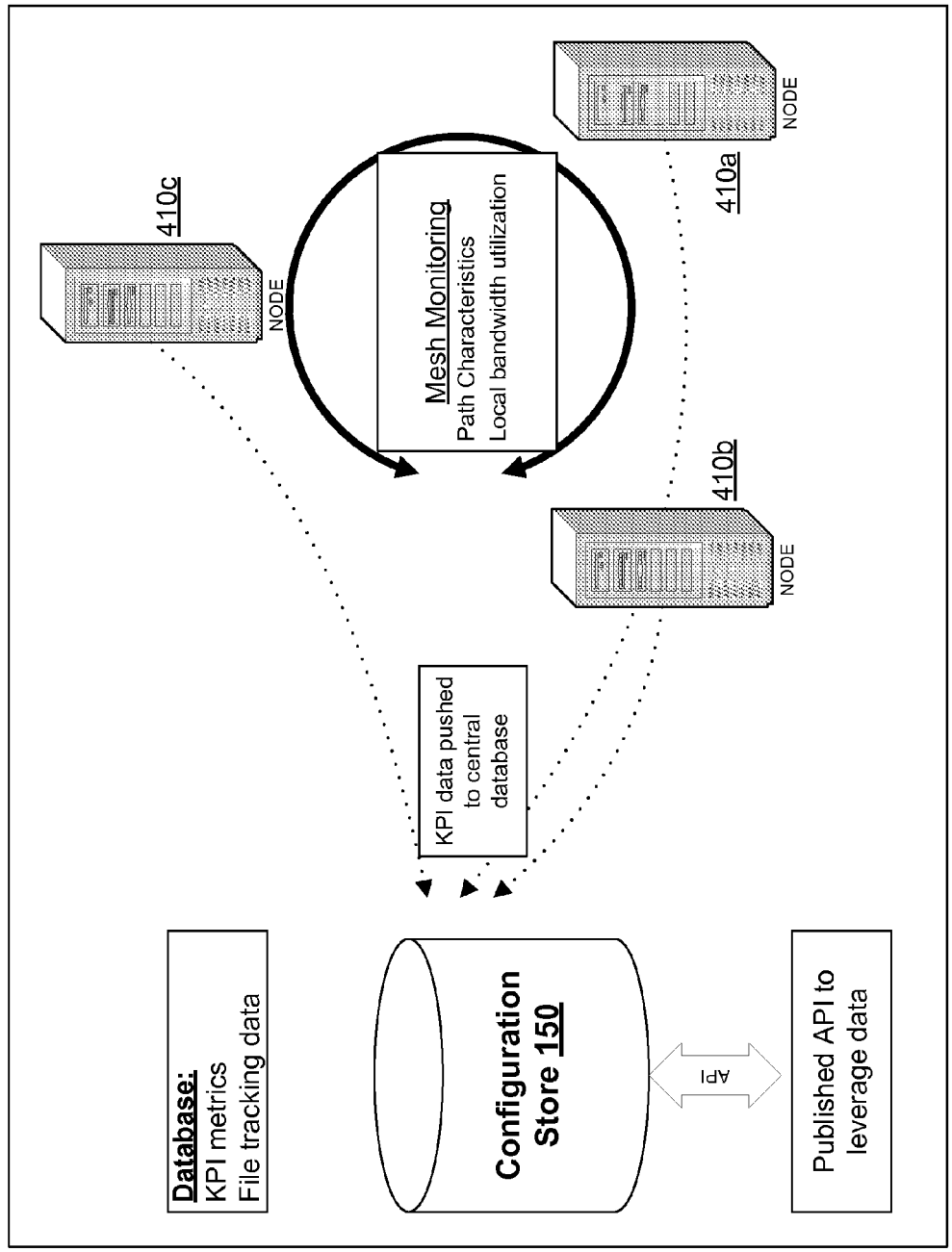
FIG. 4 is a system environment illustrating collection of historical network data for the network links of a private cloud, according to one embodiment.

FIG. 4 illustrates how historical data is collected fix network links in the private cloud. The various nodes 410 of the private cloud are monitored to observe their path characteristics. The KPIs associated with nodes and paths associated with the nodes are measured and stored in the configuration store 150 for analysis by the route analyzer 195. For example, the route analyzer 195 may analyze performance of a particular network link to determine if the link is a high-performance link with hardware for expedited data transfer. In an embodiment, the route analyzer 195 identifies a link as a high-performance link if transfers of large EDA data sets cause very little deterioration of the network link performance.

In an embodiment, the route analyzer 195 determines a score indicative of the performance of a network link based on the degree of deterioration in performance caused by an increase in load over the link. The by the route analyzer 195 determines whether the link is a high-performance link with specialized hardware to handle high data transfer loads if the performance score is above a threshold value. On the other hand the route analyzer 195 determines a network link to be a low-performance network link if transfer of small EDA data sets causes the network link performance to deteriorate significantly. The scheduler 180 uses the information regarding the presence of specialized hardware associated with links is to make decisions in scheduling data transfer tasks. For example, the scheduler 180 schedules higher data transfer loads for transfer via a high-performance link with specialized hardware compared to another link determined to have no special hardware. Alternatively, if an EDA library needs to be transferred at a short notice to satisfy a deadline associate with a project, the scheduler 180 schedules a transfer of the EDA library for transmission via the network link with specialized hardware for expedited data transfer.

Figure 5:
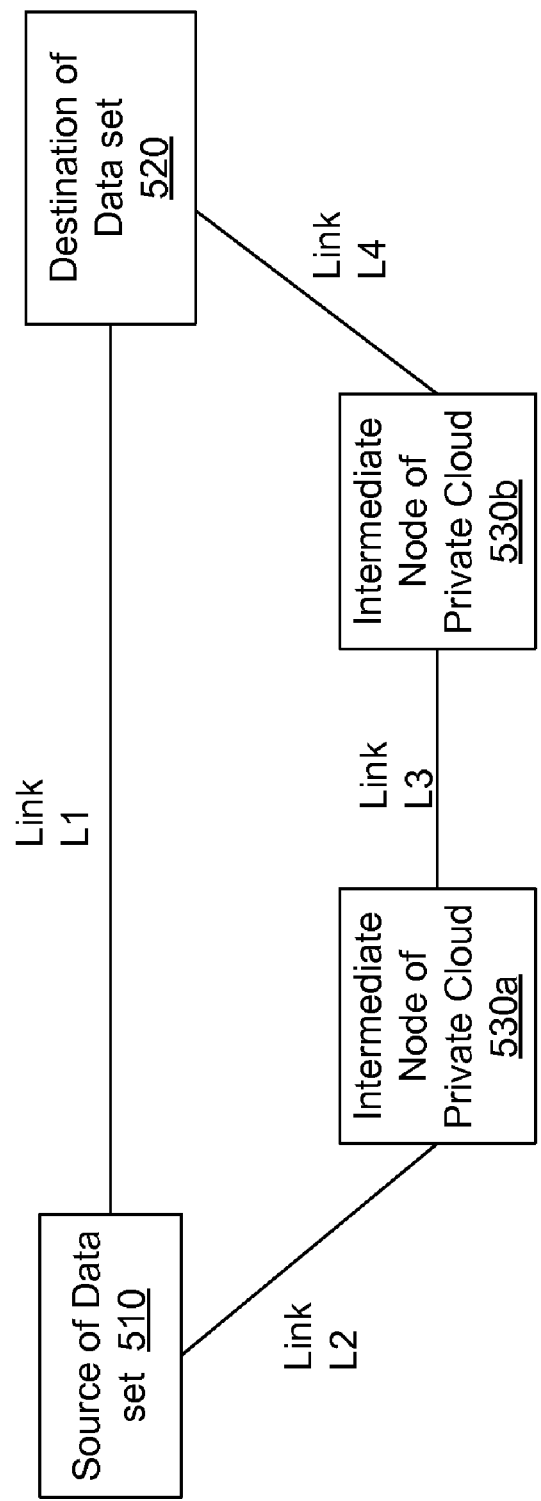
FIG. 5 is a diagram illustrating a source of a data set connected to a destination of the data set via a direct connection as well as via a path involving multiple hops, according to one embodiment.

FIG. 5 illustrates two alternative network paths between a source 510 of a data set and a destination 520 of the data set. The first path is a direct path via link L1. The second path is a path via intermediate nodes 530a and 530b of the private cloud connected using links L2, L3 and L4. Historical data based on performance of the links may indicate that the path using the direct link L1 transfers large data sets much slowly compared to the path using the network links L2, L3, and L4 even though there are multiple hops in the latter path. As a result, the scheduler schedules data transfer of large data sets via the path using the network links and L4 instead of the direct network link L1.

In one embodiment, the schedule 180 schedules a plurality of data sets to be transferred from source 510 to destination 520 such that smaller data sets are transferred via the link L1 and large data sets are transferred via the network links L2, L3, and L4. The route analyzer 195 also utilizes historical data to determine typical times during which the network link has low load. This information is used by the scheduler 180 for scheduling data transfer via the network links. For example, the scheduler 180 may schedule data for transfer at times during which the network traffic is typically low in the corresponding links. The scheduler 180 may schedule transfer of data sets via link L1 at a time different from the transmission of data sets via links L2, L3, and L4 (based on their observed low traffic periods).

In one embodiment, the scheduler 180 schedules a data set for transfer from an source 510 if the observed path characteristics from the source indicate a faster transfer compared to other sources possessing the same data. The scheduler 180 can select a network path based on the urgency of the data transfer. For example, the scheduler 180 may determine that a data set expected to be used by a particular stage of the project does not have to be transferred urgently based on an EDA project schedule. The scheduler 180 schedules transfer of such data set via the slow link L1 (even though the data set is large) so as to allow transfer of more urgent data sets via the faster links L2, L3, and L4.

The systems and methods presented provide for efficient distribution of data sets/libraries for EDA workload runs in geographically distributed clouds. The distribution strategies consider various policies specific to EDA workload runs in order to determine the sources and destinations of the data sets. The appropriate model for distributing data sets to each destination is determined as one of a multicast model, unicast model, or a p2p model. Needs of design centers are anticipated in order to schedule transfer of the libraries to the respective data centers ahead of the need. The knowledge of the requirements of the design centers is utilized for efficient routing and delivery of the data sets from EDA library stores 120a, 120b to the design centers 110a, 110b.

ALTERNATIVE APPLICATIONS

The foregoing description of the embodiments has been presented for the purpose of illustration; it is not intended to be exhaustive or to limit to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, white described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

What is claimed is:

1. A computer-implemented method for delivering electronic design automation (EDA) libraries using a geographically distributed private cloud including EDA design centers and EDA library stores, the method comprising:

receiving information describing EDA projects, each EDA project associated with EDA design centers in a private cloud;

receiving information describing EDA libraries, each EDA library stored at a library store in the private cloud;

associating an EDA library with a set of EDA projects by matching the information describing the EDA library with information describing the EDA projects;

for each EDA project in the set of EDA projects, determining a project stage requiring the EDA library;

determining a data delivery model for transmitting the EDA library to a set of design centers hosting the EDA projects in the set of EDA projects; and scheduling a delivery of the EDA library to each design center in the set of design centers based on a deadline associated with the project stage requiring the EDA library.

2. The computer-implemented method of claim 1, wherein matching the EDA library with one or more EDA projects comprises:

identifying attributes of previous EDA projects in which the EDA library was used; and selecting EDA projects that match the identified attributes of the previous EDA projects in which the EDA library was used.

3. The computer-implemented method of claim 1, wherein determining the data delivery model is further based on the number of library stores providing the EDA library and the number of design centers in the set of design centers.

4. The computer-implemented method of claim 1, wherein the data delivery model comprises one of a multicast model, a unicast model, and a peer-to-peer model.

5. The computer-implemented method of claim 1, wherein scheduling the EDA library gives higher priority to delivery of a first EDA library used by a first stage of an EDA project over a second EDA library used by a second stage of the EDA project if the first stage is executed before the second stage.

6. The computer-implemented method of claim 1, wherein scheduling the EDA library gives higher priority to delivery of an EDA library for a first EDA project currently being executed compared to a second EDA project scheduled for future execution.

7. The computer-implemented method of claim 1, wherein determining the stage of the EDA project requiring the EDA library comprises:

receiving a newer version of the EDA library;

identifying EDA projects with previous versions of the EDA library; and anticipating a testing stage for testing the newer version of the EDA library.

8. The computer-implemented method of claim 1, wherein information describing an EDA projects comprises a project schedule providing timeline for execution of stages of the EDA project.

9. The computer-implemented method of claim 1, wherein information describing one or more EDA libraries comprises one or more of attributes describing a version of the library, the library store in which the library is stored, and the size of the library.

10. The computer-implemented method of claim 1, wherein an EDA library for use in a testing stage is scheduled for delivery after another EDA library for use in a design stage of EDA project.

11. The computer-implemented method of claim 1, wherein scheduling the EDA library for delivery comprises arranging a first EDA library for delivery via a first link determined as having hardware for expedited data transmission and arranging a second EDA library via a second link determined as not having hardware for expedited data transmission, the first EDA library having a deadline for delivery before the second EDA library.

12. The computer-implemented method of claim 11, wherein determining a link as having a specialized hardware for fast data transmission comprises:
   increasing data transmission load on the link; and
   responsive to a measure of deterioration of performance being below a threshold value, determining the link to have specialized hardware for data transmission.

13. A computer-implemented system for delivering electronic design automation (EDA) libraries using a geographically distributed private cloud including EDA design centers and EDA library stores, the system comprising:
   a computer processor; and
   a computer-readable storage medium storing computer program modules configured to execute on the computer processor, the computer program modules comprising:
      a configuration store configured to:
         receive information describing EDA projects, each EDA project associated with EDA design centers in a private cloud; and
         receive information describing EDA libraries, each library stored at a library store in the private cloud;
      a rule engine configured to:
         associate an EDA library with a set of EDA projects by matching the information describing the EDA library with information describing the EDA projects; and
         for each EDA project in the set of EDA projects, determine a project stage requiring the EDA library;
      a scheduler configured to:
         determine a data delivery model for transmitting the EDA library to a set of design centers hosting the EDA projects in the set of EDA projects; and
         schedule a delivery of the EDA library to each design center in the set of design centers based on a deadline associated with the project stage requiring the EDA library.

14. The system of claim 13, wherein the rule engine is further configured to:
   identify attributes of previous EDA projects in which the EDA library was used; and
   select EDA projects that match the identified attributes of the previous EDA projects in which the EDA library was used.

15. The system of claim 13, wherein rule engine is further configured to:
   receive information describing a newer version of the EDA library;
   identify EDA projects with previous versions of the EDA library; and
   anticipate a testing stage for testing the newer version of the EDA library.

16. The system of claim 13, further comprising a route analyzer module configured to determine a first link as having hardware for expedited delivery of data and determine a second link as not having hardware for expedited data transmission, wherein the scheduler is further configured to arrange a first EDA library for delivery via the first link and arranging a second EDA library via the second link, the first EDA library having a deadline for delivery before the second EDA library.

17. The system of claim 16, wherein the route analyzer module is further configured to:
   increase data transmission load on the first link; and
   responsive to a measure of deterioration of performance due to increase of load being below a threshold value, determine the first link as having hardware for expedited data transmission.

18. A non-transitory computer-readable storage medium storing computer-executable code for delivering electronic design automation (EDA) libraries using a geographically distributed private cloud including EDA design centers and EDA library stores, the computer program product comprising:
   a configuration store configured to:
      receive information describing EDA projects, each EDA project associated with EDA design centers in a private cloud; and
      receive information describing EDA libraries, each library stored at a library store in the private cloud;
   a rule engine configured to:
      associate an EDA library with a set of EDA projects by matching the information describing the EDA library with information describing the EDA projects; and
      for each EDA project in the set of EDA projects, determine a project stage requiring the EDA library;
   a scheduler configured to:
      determine a data delivery model for transmitting the EDA library to a set of design centers hosting the EDA projects in the set of EDA projects; and
      schedule a delivery of the EDA library to each design center in the set of design centers based on a deadline associated with the project stage requiring the EDA library.

19. The computer readable storage medium of claim 18, the rule engine is further configured to:
   identify attributes of previous EDA projects in which the EDA library was used; and
   select EDA projects that match the identified attributes of the previous EDA projects in which the EDA library was used.

20. The computer readable storage medium of claim 18, wherein the rule engine is further configured to:
   receive information describing a newer version of the EDA library;
   identify EDA projects with previous versions of the EDA library; and
   anticipate a testing stage for testing the newer version of the EDA library.

* * * * *